U.S. Patent Number: 4,657,958
Fieldhouse et al.
Date of Patent: * Apr. 14, 1987

[54] CONTACT ADHESIVE AND ADHESIVE SYSTEM FOR EPDM ELASTOMERS

[75] Inventors: John W. Fieldhouse, Mogadore; Mark L. Stayer, Suffield, both of Ohio

[73] Assignee: The Firestone Tire & Rubber Company, Akron, Ohio

[*] Notice: The portion of the term of this patent subsequent to May 22, 2001 has been disclaimed.

[21] Appl. No.: 827,456

[22] Filed: Feb. 11, 1986

Related U.S. Application Data

[63] Continuation-in-part of Ser. No. 708,616, Mar. 5, 1985, abandoned.

[51] Int. Cl.$^4$ ............ C08K 5/01; C08K 3/36; C08K 5/17; C08K 5/05
[52] U.S. Cl. .................. 524/247; 524/249; 524/251; 524/379; 524/385; 524/389; 524/390; 524/413; 524/432; 524/433; 524/489; 524/490; 524/493; 524/511
[58] Field of Search ............... 524/247, 249, 251, 379, 524/385, 389, 390, 432, 413, 490, 481, 433, 511

[56] References Cited

U.S. PATENT DOCUMENTS

| | | | |
|---|---|---|---|
| 4,169,820 | 10/1979 | Bock et al. | 524/322 |
| 4,187,206 | 2/1980 | Brenner | 524/577 |
| 4,277,381 | 7/1981 | Bock et al. | 250/DIG. 31 |
| 4,450,252 | 5/1984 | Fieldhouse | 428/506 |
| 4,480,012 | 10/1984 | Fieldhouse | 428/506 |

FOREIGN PATENT DOCUMENTS 0002355 6/1979 European Pat. Off. .... 260/DIG. 31

Primary Examiner—Herbert J. Lilling
Attorney, Agent, or Firm—Frank J. Troy, Sr.

[57] ABSTRACT

Adhesive compositions for bonding EPDM elastomers comprise (a) a neutralized sulfonated EPDM elastomeric terpolymer; (b) an organic hydrocarbon solvent; (c) an ionic plasticizer or mixture of ionic plasticiziers; (d) a phenolic hydrocarbon resin or mixture of phenolic hydrocarbon resins and (e) a material selected from mineral oils, petroleum oils, polybutenes, polyisobutylenes and ethylene/propylene copolymers. Such adhesive compositions are particularly suitable for bonding sheets of black EPDM, especially sheets of cured black EPDM, elastomeric membranes together and may also be utilized to bond sheets of cured black EPDM to other uncured elastomers and to non-elastomeric substrates as well.

The adhesive compositions to proper selection of the component (e) material and the addition of a color pigment or dye thereto may also be used to bond colored EPDM elastomers such as white, blue, yellow, green, etc.

An adhesive composition for bonding sheets of EPDM elastomeric roofing membrane in cases where the membrane is to be anchored to the roof surface by mechanical systems will further contain a hydrophobic silica.

42 Claims, No Drawings

CONTACT ADHESIVE AND ADHESIVE SYSTEM FOR EPDM ELASTOMERS

CROSS-REFERENCES TO RELATED APPLICATIONS

This is a continuation-in-part of U.S. application Ser. No. 708,616, filed Mar. 5, 1985, now abandoned.

BACKGROUND OF THE INVENTION

The invention relates to a contact adhesive and adhesive system for EPDM elastomers. More particularly, the invention relates to an adhesive composition for bonding an EPDM elastomer to itself or for bonding an EPDM elastomer to another elastomer or to a non-elastomeric material.

EPDM elastomers have long been of interest for possible use as a roofing material, particularly for the industrial and commercial flat roofing markets. EPDM elastomers are of interest as roofing materials due to the fact that such elastomers provide significant advantages in flexibility and long term weathering resistance over conventional built up roofing (BUR) materials which are composed of tar paper composites which have poor flexibility and only very limited weathering resistance.

However, despite these advantages, the use of EPDM elastomers in roofing applications in the past has been hampered by certain disadvantages relating to the nature of the field prepared lap splice. This is a significant disadvantage since in applying EPDM sheets to a roof, it is usually necessary to splice two (2) or more EPDM elastomer sheets together. This splice or seam area is subjected to both short term and long term stresses such as those caused by roof movement, heavy winds, freeze-thaw cycling and thermal cycling. Such stresses may manifest themselves in shear forces or peel forces, i.e., the seam peels back producing an open seam under severe conditions or a partially open seam (often referred to as a fish-mouth condition) under less severe conditions.

A further disadvantage to the use of EPDM elastomers as a roofing membrane material is the lack of adhesion of EPDM to other elastomeric materials and to non-elastomeric materials which are frequently encountered on roofs, especially the flat roofs of commercial and industrial buildings. Thus, on most flat roofs of that type, there are usually metal pipes, metal vents, air-conditioning units and the like which either extend from or are attached to the roof surface. In such cases, it is necessary to apply an elastomeric flashing compound around those areas where the metal pipes, vents, air-conditioning units, etc. meet the roof surface in order to prevent water from seeping through the roof. Such elastomeric flashing compounds are conventionally composed of a neoprene type elastomer. As will be evident, it is necessary to bond the EPDM elastomer roofing membrane to the elastomeric flashing compound. In addition, it is often necesary to bond the EPDM elastomer roofing membrane to non-elastomeric materials such as wood, masonry, metal, glass, bituminous materials, insulation materials and the like.

As will be apparent from the foregoing, it is necessary to utilize an adhesive to bond EPDM elastomer roofing membranes together or to other elastomeric materials or to non-elastomeric materials. However, such an adhesive must meet a number of requirements which have proven to be extremely difficult to completely satisfy. Thus, the adhesive must provide sufficient peel and adhesive strength to permit splices formed by bonding EPDM elastomer sheets together to resist both the short term and long term disbonding forces or stresses referred to above. Moreover, the adhesive must be resistant to oxidation, hydrolysis, and chemical attack from ponded water. Furthermore, the adhesive must be capable of being used over a broad range of ambient temperature application conditions; it must have a broad range of appplication drying times; it must be resistant to attacks by ozone, nitrous oxides, sulfur dioxide and other air pollutants; it must not cause excessive swelling of the EPDM elastomer sheets in order to prevent opening of the splices; it should have a high flash point and should not be toxic to roofing installers. The adhesive should also be compatible with other elastomers and with non-elastomeric materials as well. Finally, the adhesive must provide the important property often referred to in the adhesive art as "Quick Stick." The term "Quick Stick" as used herein means the ability of two sheets of material which have been coated with an adhesive composition to develop virtually immediate adhesive strength when placed in contact with each other.

Until recently, the use of EPDM elastomers as roofing materials was hampered by the unavailability of commercial adhesives which would meet substantially all of the above requirements. However, several recent developments have resulted in the rapidly growing use and acceptance of EPDM elastomers as roofing materials. One such development has been the increasing demands by building owners and roofing installers for roofing materials having longer service life. Another development has been the increased availability of adhesives which meet many, if not all, of the above requirements.

However, along with the increased use and acceptance of EPDM elastomers for roofing materials has come additional demands for colored or pigmented EPDM elastomers such as white EPDM elastomers for use as decorative roofing materials and for reducing thermal absorption. Applicants have found that adhesive compositions which are suitable for use with conventional black EPDM elastomer roofing membranes are in some instances not suitable for other colored EPDM elastomer roofing membranes. Moreover, adhesive compositions for colored EPDM elastomer roofing membranes must meet additional requirements over and above those described above. Thus, such adhesive compositions should not cause discoloration of the colored EPDM elastomer membrane and should not bleed through the membrane. Furthermore, the adhesive should be resistant to discoloration caused by exposure to ultraviolet rays.

The prior art relating to adhesives which are specifically designed for EPDM elastomers is somewhat limited. However, adhesive compositions containing neutralized, partially neutralized or unneutralized sulfonated elastomers, tackifying resins and organic solvents or organic solvent mixtures are known in the art as shown by U.S. Pat. Nos. 3,801,531; 3,867,247 and 4,450,252.

U.S. Pat. No. 3,801,531 relates to pressure sensitive adhesive compositions which contain thiouronium derivatives of unsaturated elastomers or neutralized, partially neutralized or unneutralized sulfonated elastomers including sulfonated EPDM, tackifying resins including phenol formaldehyde or alkylphenol formaldehyde resins and organic solvents or organic solvent mixtures including a preferred 90:10 mixture of toluene and isopropyl alcohol.

U.S. Pat. No. 3,867,247 relates to adhesive contact cements which contain neutralized, partially neutralized or unneutralized sulfonated butyl elastomers, tackifying resins including phenol formaldehyde or alkylphenol formaldehyde resins and organic solvents or organic solvent mixtures including a preferred 90:10 mixture of toluene and isopropyl alcohol.

U.S. Pat. No. 4,450,252 relates to an adhesive composition which comprises a neutralized sulfonated EPDM elastomeric terpolymer having from about 10 to about 100 milliequivalents of neutralized sulfonate groups per 100 grams of terpolymer, an organic hydrocarbon solvent or mixture of organic hydrocarbon solvent and aliphatic alcohol, a para-alkylated phenol formaldehyde tackifying resin and an alkylphenol or ethoxylated alkylphenol.

SUMMARY OF THE INVENTION

In accordance with the present invention, adhesive compositions for EPDM elastomers are provided. Such adhesive compositions comprise:

(a) 100 parts by weight of a neutralized sulfonated EPDM elastomeric terpolymer having from about 10 to about 100 milliequivalents of neutralized sulfonate groups per 100 grams of terpolymer;

(b) from about 500 to about 1500 parts by weight of an organic hydrocarbon solvent;

(c) from about 10 to about 100 parts by weight of an ionic plasticizer selected from the group consisting of aliphatic alcohols; alkylamines, alkanol amines and mixtures thereof;

(d) from about 50 to about 200 parts by weight of a phenolic hydrocarbon resin or mixture of phenolic hydrocarbon resins; and (e) from about 10 to about 200 parts by weight of a material selected from the group consisting of mineral oils, petroleum oils, polybutenes, polyisobutylenes, ethylene/propylene copolymers and mixtures thereof.

The adhesive compositions of the invention may further comprise from about 0.1 to about 35 parts by weight of a color pigment or dye. Adhesive compositions containing color pigments or dyes may be utilized to bond colored EPDM elastomers.

In a particularly preferred embodiment of the invention, the adhesive compositions will further comprise from about 10 to about 60 parts by weight of a hydrophobic silica. Such adhesive compositions are particularly useful for splicing EPDM roofing membranes which are adhered to the roof surface by mechanical means (i.e. mechanically anchored systems).

DETAILED DESCRIPTION OF THE INVENTION

The term "EPDM" as used throughout the specification and claims is used in the sense of its definition as found in ASTM-D-1418-64 and is intended to mean a terpolymer of ethylene, propylene and a diene monomer. Illustrative methods for preparing such terpolymers are found in U.S. Pat. No. 3,280,082 and British Patent No. 1,030,289, the disclosures of which are incorporated herein by reference. The preferred terpolymers contain from about 40 to about 80 weight percent ethylene and from about 1 to about 10 weight percent of the diene with the balance of the terpolymer being propylene.

The diene monomer utilized in forming the EPDM terpolymer is preferably a non-conjugated diene. Illustrative examples of non-conjugated dienes which may be employed are dicyclopentadiene, alkyldicyclopentadiene, 1,4-pentadiene, 1,4-hexadiene, 1,5-hexadiene, 1,4-heptadiene, 2-methyl-1,5-hexadiene, cyclooctadiene, 1,4-octadiene, 1,7-octadiene, 5-ethylidene-2-norbornene, 5-n-propylidene-2-norbornene, 5-(2-methyl-2-butenyl)-2-norbornene and the like. A typical EPDM is Vistalon 2504 (Exxon Chemical Co.), a terpolymer having a Mooney Viscosity (ML, 1+8, 100° C.) of about 40 and having 50 weight percent of ethylene, 45 weight percent of propylene and 5.0 weight percent of 5-ethylidene-2-norbornene with an $M_n$ as measured by GPC of about 47,000 and an $M_w$ as measured by GPC of about 174,000. Another typical EPDM is Nordel 1070 an ethylene/propylene/1,4-hexadiene terpolymer having an $M_n$ of 87,000 and an $M_w$ of 188,000 available from duPont.

The adhesive compositions of the invention may be utilized to bond a wide variety of EPDM elastomers including colored EPDM elastomers such as black, white, blue, yellow, red, green, orange, brown and the like. The colored EPDM elastomer may be prepared by incorporating various color pigments or dyes into the elastomer compound. Thus, black EPDM elastomer may be prepared by incorporating carbon black into the elastomer compound. White EPDM elastomer may be prepared by incorporating white pigments such as titanium dioxide, zinc oxide, calcium oxide and the like into the elastomer compound. Other colored EPDM elastomers may be prepared by incorporating various inorganic or organic pigments or dyes into the elastomer compound. Typical of such pigments or dyes are those which are available from Harwick Chemical Corporation under the designation Stan-Tone ® MB Colors.

Illustrative examples of such pigments and dyes which may be used to prepare EPDM elastomers of colors other than black or white are the following pigments or dyes which are identified by both their pigment type and Color Index designations (hereinafter C.I.) and include among others blue pigments such as Phthalocyanine NC (C.I. PB-15:1), Phthalocyanine RS (C.I. PB-15) and the like; yellow pigments such as Diarylide AAOT (C.I. PY-14), DiArylide AAA (C.I. PY-12) and the like; red pigments such as Thioindigo (C.I. PR-88), Red 2B, CA Salt (C.I. PR-48:2) and the like; green pigments such as Phthalocyanine BS (C.I. PG-7), Phthalocyanine YS (C.I. PG-7) and the like; orange pigments such as Pyrazolone (C.I. PO-13), Dianisidine (C.I. PO-16) and the like; and brown pigments such as Iron oxide, light (C.I. PB-7), Iron oxide, dark (C.I. PB-7) and the like. Illustrative examples of suitable dyes which may be employed include celliton yellow, celliton orange, golden yellow, golden orange I, celliton violet R, oil orange, para red, cellitozol ST, yellow AB, brown V, celliton fast yellow, sudan green, sudan violet, chrsaniline yellow and the like. All of the specific dyes mentioned above are illustrated in the publication: *The Chemistry of Synthetic Dyes and Pigments.* H. A. Tubs, Reinhold, 1955. That publication, as well as the Color Index lists a large number of pigments and dyes which may be utilized to prepare colored EPDM elastomers.

The polymer used as component (a) of the adhesive composition of the invention is a neutralized sulfonated EPDM elastomeric terpolymer having from about 10 to about 100, preferably from about 10 to about 30 milliequivalents (hereinafter meq) of neutralized sulfonate groups per 100 grams of terpolymer. It should be noted at this time that the term "neutralized" as used in the foregoing context is intended to encompass either complete neutralization of the sulfonate groups or partial neutralization of the sulfonate groups.

The neutralized sulfonated EPDM elastomeric terpolymer can be prepared by methods known in the art. Thus, for example, the neutralized sulfonated EPDM elastomeric terpolymer may be prepared by first sulfonating an EPDM elastomer using a complex of a sulfur trioxide donor and a Lewis base and then neutralizing the sulfonated EPDM with a basic material selected from an organic amine and a mono-, di-, tri or tetravalent metal ion of a metal of Groups I, II, III, IV, V, VI-B, VII-B and VIII of the Periodic Table of The Elements as described in U.S. Pat. No. 3,642,728, the disclosure of which is incorporated herein by reference.

The EPDM elastomer can also be sulfonated using a sulfonating agent selected from acetyl sulfate, propionyl sulfate and butyryl sulfate as described in U.S. Pat. No. 3,836,511, the disclosure of which is incorporated herein by reference.

The preferred neutralized sulfonated EPDM elastomeric terpolymers for use in the adhesive compositions of the invention are zinc neutralized sulfonated EPDM elastomeric terpolymers such as those described in U.S. Pat. Nos. 4,137,203 and 4,222,914, the disclosures of which are incorporated herein by reference. A particularly preferred zinc neutralized sulfonated EPDM elastomeric terpolymer for use in the adhesive compositions herein is a zinc sulfonated EPDM having a base EPDM molecular weight of 50,000, an average number of $SO_3$-groups/molecule of 13, 2.7% by weight ionic groups, a bulk density of 8-10 lbs./cu. ft., a Tg of $-60°$ C. and 25 meq of zinc sulfonate groups per 100 grams of terpolymer available under the designation IE 2590 from Uniroyal.

As indicated, the adhesive composition includes as component (b) thereof an organic hydrocarbon solvent. Virtually any of the organic hydrocarbon solvents heretofore utilized as solvents for EPDM may be utilized. Suitable organic hydrocarbon solvents which may be utilized include aromatic and aliphatic hydrocarbons such as benzene, naphtha, toluene, xylene, cyclohexane, pentane, isopentane, hexane, isohexane, heptane, and the like or mixtures thereof. A preferred organic hydrocarbon solvent is naphtha.

The amount of organic hydrocarbon solvent employed in the adhesive composition will depend upon factors such as the molecular weight of the polymer component, desired composition viscosity and the like. The adhesive composition may contain from about 500 to about 1500, preferably from 600 to 800 parts by weight of organic hydrocarbon solvent per 100 parts by weight of the polymer component.

The adhesive composition also contains as component (c) an ionic plasticizer or ionolyzer. The term ionic plasticizer or ionolizer means a material which will plasticize the ionic crosslinks of an ionic elastomer. As is well known, during the neutralization of the sulfonated EPDM terpolymer with a cation such as a metal, alkali metal or ammonium cation, ionic groups are formed. Such neutralized polymers are commonly referred to in the art as ionic polymers which by virtue of ionic association are said to contain ionic crosslinks. The ionic plasticizer aids in solubilizing these ionic crosslinks most probably by causing dissociation of the ions. However, upon removal of the organic hydrocarbon solvent and the ionic plasticizer from the adhesive composition as for example by evaporation during drying of the adhesive composition, the ionic groups reassociate thereby regenerating the crosslinks. Ionic plasticizers which may be utilized in the adhesive composition include aliphatic alcohols, alkylamines, alkanol amines and mixtures thereof. Aliphatic alcohols which may be employed include linear and branched chain alcohols such as methanol, ethanol, propanol, isopropanol, n-butanol, sec-butanol, t-butanol, n-hexanol, t-amyl alcohol, 4-methyl-2-pentanol, n-decanol and the like as well as mixtures of such alcohols. The preferred aliphatic alcohol is n-butanol. Alkyl amines which may be employed include primary, secondary and tertiary amines and cyclic amines. Illustrative examples of suitable amines which may be utilized include methylamine, ethylamine, n-propylamine, isopropylamine, n-butylamine, isobutylamine, sec-butylamine, tertiarybutylamine, n-hexylamine, n-octylamine, n-secoctylamine, dimethylamine, di-n-butylamine, di-isobutylamine, trimethylamine, triethylamine, tri-n-butylamine, tri-n-octylamine, methylethylamine, methyl-n-butylamine, tetramethylethylene diamine, cyclohexylamine, and the like. The preferred alkyl amines are the trialkyl amines and of these tri-n-butylamine is particularly preferred. Alkanol amines which may be employed include dimethylethanol amine, diethylethanol amine, dipropylethanol amine, dibutylethanol amine and the like. A preferred alkanol amine is diethylethanol amine.

The amount of ionic plasticizer included in the adhesive composition may range from about 10 to about 100, preferably from 20 to 50 parts by weight per 100 parts by weight of polymer component.

The adhesive composition of the invention additionally contains as component (d) thereof a phenolic hydrocarbon tackifying resin. Phenolic resins which may be utilized include the phenol formaldehyde resins particularly the para-alkylated phenol formaldehyde resins such as para-tertiary butyl phenol formaldehyde, para-tertiary-amyl phenol formaldehyde, para-octyl-phenol formaldehyde, para-tertiary-octyl phenol formaldehyde, para-nonylphenol formaldehyde, para-dodecyl phenol formaldehyde and the like as well as mixtures thereof. A preferred para-alkylated phenol formaldehyde resin is a para-tertiary-octyl phenol formaldehyde resin having a ring and ball softening point of 108°-124° C., a specific gravity of 1.020-1.050 and an acid number of 25-42 available from PMC Specialties Group, Inc., under the designation Dyphene 8320. Additionally, para-alkylated phenol formaldehyde resins modified by reaction with N-methylolmorpholine may also be utilized. Such methylol modified para-alkylated phenol formaldehyde resins and their method of preparation are described in U.S. Pat. No. 4,146,513, the disclosure of which is incorporated herein by reference.

A preferred methylol modified para-alkylated phenol formaldehyde resin is a methylol modified para-tertiary-octyl phenol formaldehyde resin having a ring and ball softening point of 80°-90° C., a specific gravity of 1.030-1.050, an acid number of 10-30 and a methylol content of 7.5-9.5% available from PMC Specialties Group, Inc. under the designation Dyphene 595.

Other suitable resins which may be utilized include rosin esters, the hydrogenated methyl ester of rosin, the pentaerythritol ester of rosin or hydrogenated rosin, terpene-phenol, polyterpenes, coumarone-indene or petroleum resins. Mixtures of the above resins may also be utilized.

The amount of phenolic hydrocarbon tackifying resin included in the adhesive composition may range from about 50 to about 200, preferably from 75 to 120 parts by weight per 100 parts by weight of polymer component.

The adhesive composition of the invention additionally contains as component (e) thereof a material selected from the group consisting of mineral oils, petroleum oils, polybutenes, polyisobutylenes and ethylene/propylene copolymers. Mixtures of the foregoing materials may also be employed. This component of the adhesive composition is included to enhance tack, to control drying time and to enhance peel adhesion.

The specific oil (i.e., mineral oil or petroleum oil) selected depends upon a number of factors including the viscosity and molecular weight of the oil, the tack level desired, the drying times desired and the color of the EPDM elastomer to be bonded. Thus, for example, if it is desired to utilize the adhesive to bond colored EPDM elastomers other than black EPDM elastomers, a white mineral oil or a non-staining petroleum oil should be employed. On the other hand, if the adhesive is to be used to bond black EPDM elastomers, virtually any of the petroleum processing oils utilized in rubber compounds may be employed. Thus, petroleum oils used in adhesives for bonding black EPDM elastomers may be paraffinic, naphthenic or aromatic oils. The preferred petroleum oils for that purpose are aromatic oils having aromatic contents of about 60% and viscosities, SUS (Saybolt Universal Seconds) at 100° F, ranging from about 140 to about 27,000 with the particularly preferred aromatic oils having viscosities, SUS at 100° F, ranging from about 140 to about 6000.

Polybutenes which may be employed as component (e) of the adhesive composition are in general viscous, non-drying liquid butylene polymers composed predominately of high molecular weight mono-olefins (95-100%) with the balance being isoparaffins. Particularly suitable polybutenes are those having average molecular weights as determined by vapor pressure osmometry ranging from about 150 to about 5000, preferably from 320 to 2300. Typical illustrations of suitable polybutenes are those available from Amoco under the designations Indopol H-50 and H-1900. Indopol H-50 polybutene has a viscosity at 99° C. of 109–125 centistokes and an average molecular weight (VPO) of 750 while Indopol H-1900 polybutene has a viscosity at 99° C. of 4069–4382 centistokes and an average molecular weight (VPO) of 2300.

Polyisobutylenes which may be employed may range from low molecular weight semi-liquid polymers to high molecular weight solid polymers. Thus, the suitable polyisobutylenes may have approximate viscosity average molecular weights ranging from about 55,000 to about 2,350,000. Typical illustrations of polyisobutylenes which may be employed are the polyisobutylenes which are available from Exxon Chemical Company under the designation Vistanex such as, for example, Vistanex MM L-120 polyisobutylene which has an approximate viscosity average molecular weight ranging from 1,450,000–1,900,000.

Ethylene/propylene copolymers which may be employed are in general viscous liquid polymers containing from about 55 to about 80 mole percent of ethylene with the balance being propylene. Suitable ethylene/propylene copolymers are those having number average molecular weights, $M_n$, ranging from about 7,000 to about 30,000 and intrinsic viscosities as measured in decane at 235° C. of from 0.6 to 1.2.

The amount of component (e) included in the adhesive composition may range from about 10 to about 200, preferably from 20 to 150, parts by weight per 100 parts by weight of the polymer component.

The adhesive composition depending on the color of the EPDM elastomer to be bonded may further contain a color pigment or dye. It should be noted that when the adhesive is to be used to bond black EPDM elastomers it is not essential to include a color pigment or dye in the adhesive. The reason for this fact is that the adhesive composition due to the presence of the phenolic hydrocarbon resin and in some cases the processing oil is already dark or dark amber in color. However, if it is desired to more closely match the color of the adhesive to the black EPDM elastomer this can readily be accomplished by incorporating a small amount (e.g., from 1 to 9 parts) of carbon black into the adhesive.

In instances where it is desired to utilize the adhesive composition to bond colored EPDM elastomers other than black EPDM elastomers, the adhesive composition will further contain a color pigment or dye. As will be evident, the color pigment or dye which is incorporated into the adhesive composition will be selected so as to match the color of the colored EPDM elastomer which is to be bonded with the adhesive. One of ordinary skill in the art of preparing colored products can select the proper pigment or dye using routine experimentation. Color pigments or dyes which may be included in the adhesive composition may be any of those described above in connection with the description of colored EPDM elastomers.

Amounts of color pigment or dye which may be included in the adhesive composition will depend upon the specific color pigment or dye which is selected and the intensity of the color desired. Thus, for example, if a white pigment such as titanium dioxide, zinc oxide or calcium oxide is selected, the amounts of white pigment included in the adhesive composition may range from about 1 to about 35 parts by weight per 100 parts by weight of polymer component. On the other hand, if a color pigment other than white is selected such as, for example, blue, yellow, red etc., the amounts of such pigments included in the composition may range from about 0.1 to about ·5.0, preferably 0.5 to 2.0 parts by weight per 100 parts by weight of polymer component. It should be noted that in certain instances it may be desirable to utilize mixtures of white color pigments with other color pigments in order to produce different color shades. In view of the foregoing, it may be stated that the amounts of color pigment or dye which may be included in the adhesive composition may range from about 0.1 to about 35 parts by weight per 100 parts by weight of polymer component.

In addition to the above components, the adhesive compositions of the invention may contain other special purpose additives. Thus, for example, adhesive compositions for black EPDM elastomers may additionally contain reinforcing fillers such as carbon black, silica or mixtures thereof while adhesive compositions for colored EPDM elastomers other than black may contain reinforcing fillers such as silica. Such adhesive compositions may contain from about 10 to about 60, preferably from 30 to 50, parts by weight of said reinforcing fillers per 100 parts by weight of polymer components. Moreover, adhesive compositions for colored EPDM elastomers other than black may contain ultraviolet light absorbers in order to prevent discoloration of adhesive layers which extend beyond splice areas.

The particularly preferred embodiment of the invention relates to adhesive compositions for bonding sheets of elastomeric EPDM roofing membranes together in situations where the elastomeric membrane is to be adhered to or anchored to the roof surface by mechanical means (i.e. mechanically anchored systems).

It should be noted here as is well known in the commercial roofing industry that elastomeric roofing membranes may be anchored to or otherwise held in place on the roof surface using several different systems including a ballast system, an adhesive system and a mechanically anchored system. The ballast system simply involves depositing a layer of a suitable ballast material such as gravel on the upper surface of the elastomeric membrane to hold it in place on the roof. The adhesive system is a fully adhered system which involves applying a coating of a suitable adhesive on the roof surface before the elastomeric roofing membrane is applied to the roof. The adhesive may be the same as or different from the adhesive used to bond sheets of the elastomeric membrane together. The mechanically anchored system generally involves the use of metal strips, often referred to as batten strips, and nails to anchor the elastomeric membrane to the roof surface although other mechanical fasteners may also be used.

Applicants have discovered that the splice or seam areas of elastomeric EPDM roofing membranes which are formed using an adhesive are subjected to even greater stress in cases where the elastomeric roofing membrane is attached to the roof surface by mechanically anchored systems than in cases where the elastomeric roofing membrane is attached to the roof surface using either the above-described ballast system or adhesive system. This is particularly the case when the elastomeric roofing membrane is installed on the roof surface during periods of high ambient temperatures such as those commonly encountered during the summer months in the northern United States and in the spring and summer months in the southern United States. It has been found that during such periods the elastomeric roofing membrane will contract as the ambient temperature falls during the nighttime and early morning hours and that in many instances the contraction and the attendant stress on the splice areas of the mechanically anchored membrane are of such magnitude as to result in partially opened splices or the so-called fishmouth condition described above. As will be appreciated, such conditions are undesirable. Accordingly, the discovery of a way to eliminate or substantially minimize such conditions would represent a significant advance in the art.

In accordance with the particularly preferred embodiment of the invention, applicants' have surprisingly discovered that such problems can be substantially eliminated by including in the adhesive composition used to bond or splice sheets of the elastomeric roofing membrane together a suitable quantity of a hydrophobic silica. A preferred hydrophobic silica which may be utilized for that purpose is a hydrophobic silica having an $SiO_2$ content of $>99.8\%$, a surface area of $120\pm 30 m^2/g$, an average primary particle size of 16 millimicrons, a carbon content of $1.1\pm 0.2\%$ and a pH as determined on a 4% dispersion in a 1:1 mixture of methanol and water of 3.5–4.1, available from the DeGussa company under the trade name Aerosil R972.

Amounts of hydrophobic silica which may be employed in the adhesive composition may range from about 10 to about 60, preferably from 30 to 50, parts by weight per 100 parts by weight of polymer component. It should be noted that such adhesive compositions may be used to bond both black and other color EPDM elastomeric roofing membranes. In instances where the adhesive composition containing hydrophobic silica is to be used for bonding black EPDM roofing membranes, the adhesive as indicated above may if desired further contain a small amount, i.e., 1 to 9 parts by weight, of carbon black. In instances where the adhesive composition containing hydrophobic silica is to be used for bonding colored EPDM roofing membranes other than black, the adhesive may further contain color pigments or dyes of the types and in the amounts described above.

The adhesive compositions of the invention may have varying solids contents and viscosities depending upon factors such as the desired method of application, desired drying times and the like. In general, the adhesive compositions may have solids contents of from about 10 to about 50 percent, preferably 20 to 40 percent by weight and Brookfield viscosities (#2 spindle, 6 RPM) as measured at room temperature of from about 500 to about 25,000 centipoises, preferably from about 1,500 to 5,000 centipoises.

The adhesive compositions can be prepared by any conventional procedure using conventional mixing techniques and equipment. Thus, the adhesive composition components can be simply charged to a suitable mixing vessel equipped with stirring means and mixed together with or without added heating to facilitate dissolution.

The following examples are submitted for the purpose of further illustrating the nature of the present invention and are not to be considered as a limitation on the scope thereof. Parts and percentages shown in the examples are by weight, unless otherwise indicated.

EXAMPLE 1

This example illustrates the preparation of an adhesive composition for bonding black EPDM elastomer and the use of the adhesive to bond cured sheets of black EPDM elastomer together and to bond black EPDM elastomers to other substrates.

The adhesive composition had the following formulation:

| Ingredients | Parts by weight (grams) |
|---|---|
| IE2590* | 100.0 |
| Dyphene 8320** | 100.0 |
| Aromatic Oil*** | 100.0 |
| Tri-n-butylamine | 25.0 |
| n-butanol | 25.0 |
| VM&P Naphtha | 800.0 |
| TOTAL | 1,150.0 |

*Zinc sulfonated EPDM available from Uniroyal described above.
**A para-tertiary-octylphenol formaldehyde resin available from PMC Specialties Group, Inc. described above.
***An aromatic oil having a viscosity, SUS 100° F., of 3500, a specific gravity at 60° F. of 0.9979 and a molecular weight of 375, available from Sun Oil Company under the designation Sundex 790.

The adhesive composition was prepared by first adding the n-butanol, tri-n-butylamine, aromatic oil and naphtha to a reactor. Then, the Dyphene 8320 resin was added to the reactor with stirring. The reactor was then heated to 80° C. After the reactor reached 80° C., IE2590 was charged to the reactor with stirring. Heating at 80° C. was then continued for 20 hours. The reactor was subsequently cooled to room temperature with continued stirring. The resultant adhesive had a total solids content of 26.1% and a Brookfield Viscosity (#2 Spindle, 6RPM) at 24° C. of 2100-2500 centipoises.

The adhesive was then used to bond two cured sheets of cellulose coated black EPDM elastomer together using the following procedure: two 6"×6"×0.060" cellulose coated sheets of compounded and cured black EPDM elastomer were washed with unleaded gasoline and a hand-held nylon scrub brush. After drying for several minutes, the sheets were coated with the above adhesive using a paint brush. Approximately 4-5 ml was used to cover a 4"×6" area of each 6"×6" sheet. The adhesive was allowed to dry for 15 minutes at room temperature (i.e., 23°-24° C.). The sheets were then placed face to face with adhesive side to adhesive side and manually pressed together to bond the sheets together. Then, the resulting pad was rolled with a 5½" wide, 7" diameter, 55 lb. roller across the width of the pad at a rate of about 2" per second. This was repeated 4 times. The pad was then allowed to dry at room temperature for one week before being subjected to various aging conditions. The 6"×6" pads were then cut into 6 one inch wide strips, the top 2 inches of each strip having no adhesive applied thereto. The test strips were then evaluated for peel adhesion strength. Peel adhesion of each test strip was conducted on an Instron tester operating at 2" per minute using the 180° T peel adhesion test set forth in ASTM D-1876. The peel adhesion strengths of the test strips were determined at room temperature (i.e., 25° C.). Peel adhesion results are shown in Table I.

TABLE I

| | R.T., PLI* |
|---|---|
| aged 1 day at 25° C. | 5 |
| aged 7 days at 25° C. | 9-11.5 |
| aged 7 days at 50° C. | 10-12.5 |
| aged 7 days at 70° C. | 15-16 |
| aged 7 days at 120° C. | 11-12.5 |

*Pounds per linear inch at room temperature (R.T.).

The adhesive composition of Example 1 was also utilized to bond cured black EPDM elastomer to uncured black EPDM, wood, brick, fiberboard, aluminum foil and asphalt substrates. The adhesive pads were prepared substantially in accordance with the procedure described above except that the substrates were not washed with gasoline. Peel adhesion on the pads containing the uncured black EPDM and aluminum foil substrates were conducted on the Instron tester using the 180° T peel adhesion test specified in ASTM D-1876. Peel adhesion on the pads containing the fiberboard and asphalt substrates were conducted on the Instron tester using a modified 180° peel adhesion test. Peel adhesion on the pads containing wood and brick substrates were conducted on the Instron tester using the 90° peel adhesion test specified by the Pressure Sensitive Tape Council designated PSTC #5. Peel adhesion results are shown in Tables II and III.

TABLE II

| Pad Substrate | Pad Aging | R.T., PLI |
|---|---|---|
| Wood | 7 days at 25° C. | 9-11 |
| Brick | 7 days at 25° C. | 9-10 |
| Fiberboard | 7 days at 25° C. | 2-3* |
| Aluminum Foil | 7 days at 25° C. | 3-6* |

TABLE II-continued

| Pad Substrate | Pad Aging | R.T., PLI |
|---|---|---|
| Asphalt | 7 days at 25° C. | 2.5-4* |

*Peel adhesion results reflect substrate failure rather than adhesive failure.

TABLE III

| Pad Substrate | Pad Aging | R.T., PLI |
|---|---|---|
| (Uncured EPDM)** | 7 days at 70° C. | 18-19 |
| | 14 days at 70° C. | 16.5-20.5 |
| | 30 days at 70° C. | 16-23 |
| | 60 days at 70° C. | 19-22 |

**Pad substrate prior to aging. On aging the uncured EPDM substrate gradually cures.

EXAMPLES 2-14

These examples illustrate adhesive compositions for bonding cured sheets of black EPDM elastomer together in which the type ionic plasticizer component, i.e. component (c), was varied as well as the aromatic oil level. The adhesive compositions were prepared and the cured sheets of EPDM elastomer were bonded together using substantially the procedure set forth in Example I. The bonded sheets of EPDM elastomer were tested for peel adhesion using the procedure of Example I. Adhesive formulations, adhesive properties and peel adhesion results are shown in Tables IV, V and VI.

TABLE IV

| | Ex. No. | | | |
|---|---|---|---|---|
| | 2 | 3 | 4 | 5 |
| Ingredients | | | | |
| IE2590 | 100.0 | 100.0 | 100.0 | 100.0 |
| Dyphene 8318* | 100.0 | 100.0 | 100.0 | 100.0 |
| Aromatic Oil of Ex. 1 | 200.0 | 200.0 | 100.0 | 100.0 |
| n-octanol | 25.0 | 50.0 | 25.0 | 50.0 |
| tri-n-butylamine | 25.0 | 25.0 | 25.0 | 25.0 |
| naphtha | 800.0 | 800.0 | 800.0 | 800.0 |
| Total | 1250.0 | 1275.0 | 1150.0 | 1175.0 |
| Brookfield Viscosity at 24° C., centipoises (cps) | 1350 | 1000 | 1500 | 1175 |
| Peel Adhesion R.T, PLI | | | | |
| aged 1 day at 25° C. | 3-4 | 3-4 | 3-4 | 2-3 |
| aged 7 days at 25° C. | 5-6.5 | 6-6.5 | 7.5-8.5 | 8-9 |
| aged 7 days at 50° C. | 9-12 | 9-10 | 12-13 | 12-14 |
| aged 7 days at 70° C. | 12-13 | 11-13 | 11-16 | 11.5-12 |
| aged 7 days at 120° C. | 8-9.5 | 9 | 8-9 | 7.5-8 |

*A para-tertiary-octylphenol formaldehyde resin having a ring and ball softening point of 85-105° C., a specific gravity of 1.000-1.050 and an acid number of 40-60 available from PMC Specialties Group, Inc.

TABLE V

| | Ex. No. | | | | |
|---|---|---|---|---|---|
| | 6 | 7 | 8 | 9 | 10 |
| Ingredients | | | | | |
| IE2590 | 100.0 | 100.0 | 100.0 | 100.0 | 100.0 |
| Dyphene 8320 | 100.0 | 100.0 | 100.0 | 100.0 | 100.0 |
| Aromatic Oil of Ex. 1 | 100.0 | 100.0 | 100.0 | 100.0 | 100.0 |
| EPAL 610* | 25.0 | — | — | — | — |
| EPAL 108** | — | 25.0 | — | 25.0 | — |
| n-butanol | — | — | 25.0 | — | 25.0 |
| tri-n-butylamine | 25.0 | 25.0 | — | — | — |
| trioctylamine | — | — | 25.0 | — | — |
| TMEDA*** | — | — | — | 25.0 | — |
| n-butylamine | — | — | — | — | 25.0 |
| naphtha | 800.0 | 800.0 | 800.0 | 800.0 | 800.0 |
| Total | 1150.0 | 1150.0 | 1150.0 | 1150.0 | 1150.0 |
| Brookfield Viscosity at 24° C., cps | 3700 | 3900 | 1700 | 4700 | 1800 |

TABLE V-continued

| | Ex. No. | | | | |
|---|---|---|---|---|---|
| | 6 | 7 | 8 | 9 | 10 |
| Peel Adhesion R.T, PLI | | | | | |
| aged 1 day at 25° C. | 4-5 | 4 | 4-5 | 7-7.5 | 0-0.5 |
| aged 7 days at 25° C. | 11.5-13 | 11-13 | 11-12.5 | 11-12.5 | 0.5-1 |
| aged 7 days at 50° C. | 17.5-22 | 14-18 | 15-16 | 13-16 | 7-8 |
| aged 7 days at 70° C. | 17-24 | 18.5-21.5 | 17-19 | 14-17 | 5-7 |
| aged 7 days at 120° C. | 11-13 | 13.5-15.5 | 12-13 | 12-15 | 13-5 |

*50:50 mixture of n-hexanol and decanol available from Ethyl Corporation
**50:50 mixture of n-octanol and decanol available from Ethyl Corporation
***tetramethylethylene diamine

TABLE VI

| | Ex. No. | | | |
|---|---|---|---|---|
| | 11 | 12 | 13 | 14 |
| Ingredients | | | | |
| IE2590 | 100.0 | 100.0 | 100.0 | 100.0 |
| Dyphene 8320 | 100.0 | 100.0 | 100.0 | — |
| Dyphene 8318 | — | — | — | 100.0 |
| Aromatic Oil of Ex. 1 | 100.0 | 100.0 | 100.0 | 200.0 |
| isopropanol | — | — | 25.0 | — |
| n-butanol | 25.0 | 25.0 | — | — |
| di-n-butylamine | 25.0 | — | — | — |
| DEEA* | — | 25.0 | 25.0 | — |
| tri-n-butylamine | — | — | — | 25.0 |
| naphtha | 800.0 | 800.0 | 800.0 | 800.0 |
| Total | 1150.0 | 1150.0 | 1150.0 | 1225.0 |
| Brookfield Viscosity at 24° C., cps | 2000 | 3425 | 2325 | 2025 |
| Peel Adhesion R.T, PLI | | | | |
| aged 1 day at 25° C. | 5 | 7 | 8-9 | 4-5 |
| aged 7 days at 25° C. | 7-8 | 15-18 | 11-15 | 9-10 |
| aged 7 days at 50° C. | 10-16 | 20-23 | 20-22 | 12-13 |
| aged 7 days at 70° C. | 10-17 | 16-20 | 15-25 | 16-17 |
| aged 7 days at 120° C. | 9-10.5 | 11-13 | 13-14.5 | 10-10.5 |

*N,N—diethylethanol amine

EXAMPLES 15-22

These examples illustrate adhesive compositions for bonding cured sheets of black EPDM elastomer together in which component (e) of the adhesive composition was varied.

The adhesive compositions were prepared and the cured sheets of EPDM were bonded together using substantially the procedure set forth in Example I. The bonded sheets of EPDM were tested from peel adhesion using the procedure of Example I. Adhesive formulations, adhesive properties and peel adhesion results are shown in Tables VII and VIII.

TABLE VII

| | Ex. No. | | | |
|---|---|---|---|---|
| | 15 | 16 | 17 | 18 |
| Ingredients | | | | |
| IE2590 | 100.0 | 100.0 | 100.0 | 100.0 |
| Dyphene 8340* | 50.0 | — | — | — |
| Dyphene 8320 | 50.0 | — | — | 100.0 |
| Dyphene 8318 | — | 100.0 | 100.0 | — |
| Mineral Oil | 200.0 | — | — | — |
| Indopol L-14 P.B.** | — | 100.0 | 100.0 | — |
| Indopol H-100 P.B.*** | — | — | — | 50.0 |
| tri-n-butylamine | — | 25.0 | 25.0 | 25.0 |
| n-butanol | 100.0 | 25.0 | — | 25.0 |
| naphtha | 800.0 | 800.0 | 800.0 | 800.0 |
| Total | 1300.0 | 1150.0 | 1125.0 | 1100.0 |
| Brookfield Viscosity at 24° C., cps | 1225 | 1700 | 3750 | 1900 |
| Peel Adhesion R.T, PLI | | | | |
| aged 1 day at 25° C. | 9-9.5 | 4-5 | — | 3-4 |
| aged 7 days at 25° C. | 9-12 | 7 | 5.5-7 | 7-7.5 |
| aged 7 days at 50° C. | 14-15 | 12-15 | 8-10 | 11-12.5 |
| aged 7 days at 70° C. | 14-16 | 15-18 | 11-13 | 11-13 |
| aged 7 days at 120° C. | 11-12 | 11-12 | 7 | 6-7 |

*A modified octylphenol formaldehyde resin having a ring and ball softening point of 110° C., a specific gravity of 1.023 and an acid number of 48 available from PMC Specialties Group, Inc.
**A liquid polybutene having an average molecular weight as determined by vapor pressure osmometry (VPO) of 320 and a viscosity at 38° C. of 27-33 centistokes available from Amoco.
***A liquid polybutene having an average molecular weight (VPO) of 920 and a viscosity at 99° C. of 196-233 centistokes available from Amoco.

TABLE VIII

| | Ex. No. | | | |
|---|---|---|---|---|
| | 19 | 20 | 21 | 22 |
| Ingredients | | | | |
| IE2590 | 100.0 | 100.0 | 100.0 | 100.0 |
| Dyphene 8320 | — | 100.0 | 100.0 | 100.0 |
| Dyphene 8318 | 100.0 | — | — | — |
| Indopol H-1900 P.B.* | 50.0 | — | — | — |
| Indopol H-25 P.B.** | — | — | — | 50.0 |
| Vistanex L-120 P.I.B.*** | — | 10.0 | 25.0 | 20.0 |
| n-butanol | 25.0 | 25.0 | 25.0 | 25.0 |
| tri-n-butylamine | 25.0 | 25.0 | 25.0 | 25.0 |
| naphtha | 800.0 | 800.0 | 1000.0 | 890.0 |
| Total | 1100.0 | 1060.0 | 1275.0 | 1210.0 |
| Brookfield Viscosity at 24° C., cps | 1400 | 6500 | 2775 | 2475 |
| Peel Adhesion R.T, PLI | | | | |
| aged 1 day at 25° C. | 4 | 4-5 | — | 6-6.5 |
| aged 2 days at 25° C. | — | — | 5.5-6 | — |
| aged 7 days at 25° C. | 9-10.5 | 12.5-14.5 | 6-9 | 9-14 |
| aged 7 days at 50° C. | 12.5-13.5 | 13-17 | 7.5-10 | 15.5-17 |
| aged 7 days at 70° C. | 11-15 | 13-18 | 9-10 | 15-18.5 |
| aged 7 days at 120° C. | 10-12 | 9-10 | 8-9.5 | 8-10 |

*A liquid polybutene having an average molecular weight (VPO) of 2300 and a viscosity at 99° C. of 4,069-4,382 centistokes available from Amoco.
**A liquid polybutene having an average molecular weight (VPO) of 610 and a viscosity at 99° C. of 48-56 centistokes available from Amoco.
***A polyisobutylene polymer having an approximate viscosity average molecular weight of 1,450,000-1,900,000 available from Exxon Chemical Company.

EXAMPLE 23

This example illustrates adhesive compositions containing carbon black as a reinforcing agent. The composition was prepared substantially in accordance with the procedure of Example I except that the carbon black was added as a dispersion in mineral oil. The adhesive was utilized to bond cured sheets of black EPDM and the bonded sheets tested for peel adhesion using the procedure set forth in Example I. The adhesive formulation and peel adhesion results are shown in Table IX.

TABLE IX

| Ingredients | |
|---|---|
| IE2590 | 100.0 |
| Dyphene 8340 | 50.0 |
| Dyphene 8320 | 50.0 |
| Mineral Oil/Carbon Black Dispersion* | 200.0 |
| isopropanol | 100.0 |
| naphtha | 700.0 |
| Total | 1200.0 |
| Peel Adhesion R.T, PLI | |

TABLE IX-continued

| | |
|---|---|
| aged 7 days at 25° C. | 12–16 |
| aged 7 days at 50° C. | 16–19 |
| aged 7 days at 70° C. | 16–19 |
| aged 7 days at 120° C. | 18–20 |

*mineral oil/carbon black dispersion containing 20% by weight of carbon black (i.e. 40 parts) available from Ferro Corporation under the designation Ferro P-37-741.

EXAMPLES 24–26

These examples illustrate white adhesive compositions and their use to bond cured sheets of white EPDM elastomer membrane together.

The white adhesive compositions were in general prepared by first adding the ionic plasticizer(s), naphtha, and the component (e) material (e.g., mineral oil, non-staining petroleum oil, polybutene, polyisobutylene, etc.) to a reactor. Then, the IE2590 elastomer was added to the reactor with agitation. The $TiO_2$ was then added to the reactor, the reactor was purged with nitrogen, closed and pressurized with nitrogen. The contents of the reactor were then heated at 80° C. for 20 hours. The reactor was subsequently cooled to room temperature and the Dyphene 8320 resin added with agitation until dissolved.

The resultant white adhesive was then used to bond two cured sheets of cellulose coated white EPDM elastomer together. The procedure utilized to bond the cured sheets of white EPDM elastomer together was substantially the same as described in Example I. The bonded sheets of white EPDM elastomer were tested for peel adhesion utilizing the procedure of Example I.

Adhesive formulations, adhesive properties and peel adhesion results are shown in Table X.

TABLE X

| | Ex. No. | | |
|---|---|---|---|
| | 24 | 25 | 26 |
| Ingredients | | | |
| IE 2590 | 100.0 | 100.0 | 100.0 |
| Dyphene 8320 | 100.0 | 100.0 | 100.0 |
| n-butanol | 25.0 | 25.0 | 25.0 |
| tri-n-butylamine | 25.0 | 25.0 | 25.0 |
| $TiO_2$ | 25.0 | 25.0 | 25.0 |
| Indopol H-1900, P.B. | — | 40.0 | — |
| Vistanex L-120, P.I.B. | — | — | 40.0 |
| naphtha | 700.0 | 700.0 | 700.0 |
| Mineral Oil | 100.0 | 110.0 | 110.0 |
| Total | 1075.0 | 1125.0 | 1125.0 |
| Brookfield Viscosity at 24° C., cps | 2200 | 2200 | 19,700 |
| Peel Adhesion R.T, PLI | | | |
| aged 1 day at 25° C. | 5.0 | 5–5.5 | 4–6 |
| aged 7 days at 25° C. | 8.0–9.2 | 7.8–8.4 | 7–9 |
| aged 7 days at 50° C. | 7.0–10.0 | 4.0–7.2 | 4–9.5 |
| aged 7 days at 70° C. | 2.6–4.0 | 3.0–5.0 | 2–4 |
| aged 7 days at 120° C. | 3.0–4.4 | 2.0–3.0 | 3–4.8 |

EXAMPLES 27–30

These examples illustrate the particularly preferred embodiment of the invention in which the adhesive compositions contain hydrophobic silica. As indicated above, such adhesives are particularly useful for bonding sheets of EPDM elastomeric roofing membrane together in cases where the roofing membrane is to be anchored to the roof surface using a mechanical system.

The adhesive compositions had the following formulations:

| | parts by weight Ex. no. | | | |
|---|---|---|---|---|
| | 27 | 28 | 29 | 30 |
| Ingredients | | | | |
| IE 2590 | 100.0 | 100.0 | 100.0 | 100.0 |
| Dyphene 8320 | 100.0 | 100.0 | — | 100.0 |
| Dyphene 595* | — | — | 100.0 | — |
| Aromatic Oil of Ex. 1 | — | 100.0 | 100.0 | 100.0 |
| Indopol H-1900 PB | 40.0 | — | — | — |
| n-butanol | 25.0 | 25.0 | 25.0 | 25.0 |
| Tributylamine | 25.0 | 25.0 | 25.0 | 25.0 |
| Aerosil R972 (hydrophobic silica)** | 30.0 | 30.0 | 30.0 | 50.0 |
| Naphtha | 900.0 | 900.0 | 900.0 | 900.0 |
| Total | 1220.0 | 1280.0 | 1280.0 | 1300.0 |

*methylol modified p-tertiary-octyl phenol formaldehyde resin described above.
**hydrophobic silica described above.

The above adhesive compositions were prepared using the following general procedure:

The naphtha, n-butanol and tributylamine were first charged to a reactor at 25° C. The hydrophobic silica was then added to the reactor and the resultant mixture was stirred for 15 minutes at 25° C. The IE 2590 elastomer in crumb form was then added to the reactor with stirring at 25° C. The reactor was then closed and heated with stirring at 80° C. for 1 hour. The remaining ingredients were then added to the reactor and the resultant mixture was heated with stirring at 80° C. for 3 hours.

The resultant adhesive compositions were evaluated for suitability as splice adhesives for bonding sheets of EPDM elastomeric roofing membrane in cases where the membrane is to be anchored to the roof surface by a mechanical system using a special hanging shear adhesion test. This shear adhesion test has been found to correlate to the problems of partially opened membrane splices which have been encountered in the mechanically anchored systems.

The shear adhesion test strips were prepared using the following general procedure:

Two (2) 1"×5"×0.060" thick sheets of cellulose dusted EPDM elastomeric roofing membrane were treated with gasoline, scrubbed with a nylon brush and then wiped free of gasoline and particulate matter using a cheesecloth. A 2" section of each sheet was coated with the adhesive to be tested using a 1" paint brush employing 3 brush strokes parallel to the length of the sheet. The sheets were dried at 25° C. on a bench top for 15 minutes. A 1 square inch lap splice was made by placing the sheets face to face with adhesive side to adhesive side and normally pressing the sheets together. Pressure was applied to the resulting pad by rolling the pad parallel to the length of the pad using a 12 pound roller. This was repeated 4 times. The adhesion pad was then allowed to age for 30 minutes at 25° C. An ink line was then placed at the top and bottom lap splice edge. A 300 gram weight was attached to one end of the adhesion pad and the pad was suspended in a 70° C. forced air oven and permitted to hang in the oven for 24 hours. In this "hanging" shear adhesion test, the adhesive would "pass" the test if the 1 square inch lap splice did not separate, slide or fall after 24 hours at 70° C.

In this evaluation, Examples 27 and 28, in addition to the "hanging shear test," were subsequently tested for ultimate shear strength at 25° C. using an Instron testing machine following the procedure set forth in ASTM D-816.

Test results are shown in Table IX.

TABLE IX

| | Example No. | | | |
|---|---|---|---|---|
| | 27 | 28 | 29 | 30 |
| Hanging Shear Adhesion Test | Pass | Pass | Pass | Pass |
| Ultimate Shear Adhesion (PSI) | 65 | 74 | — | — |

In contrast to the foregoing, adhesive compositions having the same formulations as Examples 27 and 28, except that they did not contain silica, failed the hanging shear adhesion test.

EXAMPLES 31-32

These examples illustrate the particularly preferred embodiment of the invention in which the adhesive compositions in addition to silica contain a small amount of carbon black. The adhesive compositions had the following formulations:

| | parts by weight Ex. No. | |
|---|---|---|
| | 31 | 32 |
| Ingredients | | |
| IE 2590 | 100.0 | 100.0 |
| Dyphene 8320 | 100.0 | 100.0 |
| Aromatic Oil of Ex. 1 | 100.0 | 100.0 |
| n-butanol | 25.0 | 25.0 |
| n-decanol | 25.0 | 12.5 |
| Tributylamine | 25.0 | 25.0 |
| Aerosil R972 | 30.0 | 30.0 |
| Naphtha | 900.0 | 900.0 |
| Carbon Black | 8.0 | 4.0 |
| Total | 1313.0 | 1296.5 |

The above adhesive compositions were mixed, the adhesion pads prepared and tested for hanging shear adhesion using substantially the same procedures as employed in Examples 27-30. Both adhesive compositions passed the hanging shear adhesion test.

We claim:
1. An adhesive composition comprising:
(a) 100 parts by weight of a neutralized sulfonated EPDM terpolymer having from about 10 to about 100 milliequivalents of neutralized sulfonate groups per 100 grams of terpolymer;
(b) from about 500 to about 1500 parts by weight of an organic hydrocarbon solvent;
(c) from about 10 to about 100 parts by weight of an ionic plasticizer selected from the group consisting of aliphatic alcohols, alkylamines, alkanol amines and mixtures thereof;
(d) from about 50 to about 200 parts by weight of a phenolic hydrocarbon resin or mixture of phenolic hydrocarbon resins; and
(e) from about 10 to about 200 parts by weight of a material selected from the group consisting of mineral oils, petroleum oils, polybutenes, polyisobutylenes, ethylene/propylene copolymers and mixtures thereof.

2. The adhesive composition of claim 1 further comprising from about 0.1 to about 35 parts by weight of a color pigment or dye.

3. The adhesive composition of claim 1 further comprising from about 10 to about 60 parts by weight of a reinforcing filler.

4. The composition of claim 1 where said neutralized sulfonated EPDM elastomeric terpolymer contains from about 10 to about 30 milliequivalents of neutralized sulfonate groups per 100 grams of terpolymer.

5. The composition of claim 1 wherein said organic hydrocarbon solvent is naphtha.

6. The composition of claim 1 wherein said ionic plasticizer is an aliphatic alcohol.

7. The composition of claim 6 wherein said aliphatic alcohol is n-butanol.

8. The composition of claim 1 wherein said ionic plasticizer is an alkyl amine.

9. The composition of claim 8 wherein said alkylamine is a trialkylamine.

10. The composition of claim 9 wherein said trialkylamine is tri-n-butylamine.

11. The composition of claim 1 wherein said ionic plasticizer is an alkanolamine.

12. The composition of claim 11 wherein said alkanol amine is diethylethanol amine.

13. The composition of claim 1 wherein said ionic plasticizer is a mixture of an aliphatic alcohol and an alkylamine.

14. The composition of claim 13 wherein said mixture is a mixture of n-butanol and tri-n-butylamine.

15. The composition of claim 1 wherein said phenolic hydrocarbon resin is a para-alkylated phenol formaldehyde resin.

16. The composition of claim 15 wherein said para-alkylated phenol formaldehyde resin is a para-tertiary-octylphenol formaldehyde resin.

17. The composition of claim 1 wherein component (e) is a petroleum oil selected from the group consisting of napthenic oils, paraffinic oils and aromatic oils.

18. The composition of claim 1 wherein component (e) is mineral oil.

19. The composition of claim 1 wherein component (e) is a liquid polybutene polymer.

20. The composition of claim 19 wherein said polybutene polymer has an average molecular weight ranging from about 150 to about 5000.

21. The composition of claim 19 wherein said polybutene polymer has an average molecular weight ranging from about 320 to about 2300.

22. The composition of claim 1 wherein said component (e) is a polyisobutylene polymer.

23. The composition of claim 22 wherein said polyisobutylene polymer has an average molecular weight ranging from about 55,000 to about 2,350,000.

24. The composition of claim 22 wherein said polyisobutylene polymer has an average molecular weight ranging from 1,450,000 to 1,900,000.

25. The composition of claim 1 wherein said component (e) is a liquid ethylene/propylene copolymer.

26. The composition of claim 25 wherein said ethylene/propylene polymer contains from about 55 to about 80 mole percent of ethylene and has a number average molecular weight ranging from about 7,000 to about 30,000.

27. The composition of claim 2 wherein said color pigment is a white pigment selected from the group consisting of titanium dioxide, zinc oxide and calcium oxide.

28. The composition of claim 2 wherein said color pigment is titanium dioxide.

29. The composition of claim 2 wherein said color pigment is selected from the group consisting of blue, yellow, red, green, orange and brown pigments.

30. The composition of claim 3 wherein said reinforcing filler is carbon black.

31. The composition of claim 1 further containing from 1 to 9 parts by weight of carbon black.

32. An adhesive composition comprising:
(a) 100 parts by weight of a neutralized sulfonated EPDM terpolymer having from about 10 to about 100 milliequivalents of neutralized sulfonate groups per 100 grams of terpolymer;
(b) from about 500 to about 1500 parts by weight of an organic hydrocarbon solvent;
(c) from about 10 to about 100 parts by weight of an ionic plasticizer selected from the group consisting of aliphatic alcohols, alkylamines, alkanol amines and mixtures thereof;
(d) from about 50 to about 200 parts by weight of a phenolic hydrocarbon resin or mixture of phenolic hydrocarbon resins;
(e) from about 10 to about 200 parts by weight of a material selected from the group consisting of mineral oils, petroleum oils, polybutenes, polyisobutylenes, ethylene/propylene copolymers and mixtures thereof; and
(f) from about 10 to about 60 parts by weight of a hydrophobic silica.

33. The composition of claim 32 further comprising from 1 to 9 parts by weight of carbon black.

34. The composition of claim 32 wherein said hydrophobic silica has an $SiO_2$ content of $>99.8\%$, a surface area of $120\pm30$ $m^2/g$, an average particle size of 16 millimicrons, a carbon content of $1.1\pm.02\%$ and a pH as determined on a 4% dispersion in a 1:1 mixture of methanol and water of 3.5–4.1.

35. The composition of claim 32 wherein said neutralized sulfonated EPDM terpolymer contains from about 10 to about 30 milliequivalents of neutralized sulfonate groups per 100 grams of terpolymer.

36. The composition of claim 32 wherein said organic hydrocarbon solvent is naphtha.

37. The composition of claim 32 wherein said ionic plasticizer is a mixture of n-butanol and tributylamine.

38. The composition of claim 32 wherein said ionic plasticizer is a mixture of n-butanol, n-decanol and tributylamine.

39. The composition of claim 32 wherein said phenolic hydrocarbon resin is a para-tertiary-octylphenol formaldehyde resin.

40. The composition of claim 32 wherein said phenolic hydrocarbon resin is a methylol modified para-tertiary-octylphenol formaldehyde resin having a methylol content of from 7.5 to 9.5%.

41. The composition of claim 32 wherein component (e) is an aromatic oil.

42. The composition of claim 32 wherein component (e) is a liquid polybutene polymer.

* * * * *